United States Patent [19]

Schneegans

[11] Patent Number: 5,389,762
[45] Date of Patent: Feb. 14, 1995

[54] STUD-WELDING PROCESS AND A DEVICE FOR CARRYING OUT THE PROCESS

[76] Inventor: Thomas H. Schneegans, Hauptstrasse 160, D7858 Weil-am-Rhein, Germany

[21] Appl. No.: 39,149
[22] PCT Filed: Oct. 15, 1991
[86] PCT No.: PCT/EP91/01950
§ 371 Date: Apr. 16, 1993
§ 102(e) Date: Apr. 16, 1993
[87] PCT Pub. No.: WO92/06814
PCT Pub. Date: Apr. 30, 1992

[30] Foreign Application Priority Data
Oct. 17, 1990 [CH] Switzerland ............ 03 325/90

[51] Int. Cl.[6] .................................... B23K 9/20
[52] U.S. Cl. ................................ 219/99; 219/98
[58] Field of Search ........................... 219/98, 99

[56] References Cited
U.S. PATENT DOCUMENTS
2,479,092 8/1949 Ainsworth ............ 219/98
3,539,758 11/1970 Ettinger ............... 219/98
4,988,842 1/1991 Van Allen .

FOREIGN PATENT DOCUMENTS
56-91983 7/1981 Japan .

Primary Examiner—Clifford C. Shaw
Attorney, Agent, or Firm—Oliff & Berridge

[57] ABSTRACT

In order to be able to weld on studs (2) with a larger than normal diameter, a stud-welding process is proposed in which the pressure applied to the stud (2) before the welding current is triggered is applied symmetrically to the stud axis (A), but extra-axially and adjustable as appropriate, thus ensuring better centering during the welding operation and also improving the quality of the weld. A suitable pressure-application device (27) is proposed for this purpose.

14 Claims, 2 Drawing Sheets

STUD-WELDING PROCESS AND A DEVICE FOR CARRYING OUT THE PROCESS

BACKGROUND OF THE INVENTION

1. Field of the Invention

The invention relates to a stud welding process in which a stud to be welded to a surface is pressed against the surface with an acceleration force and a welding current is triggered wherein a positioning pressure is applied to at least two points spaced away from the stud axis.

2. Description of Related Art

In principle, two forms of stud-welding processes are known. One employs a tip which is simultaneously subjected to a current and applied under force to the part to be welded on. This is referred to as tip ignition method. Here, large currents are built up and then discharged via the tip. Owing to the short time available during the discharge, it is not possible to accelerate the stud even further toward the part to be welded on and to immerses it deeper into the melt. As a result, this process cannot be used in the case of a stud diameter over 8 mm, as is known from specialist books (cf. Betterman "Bolzenchweisstechnik" [Stud-welding technique], page 4).

Thus, for example, JP-A-56-91 983 describes an apparatus for stud-welding, in which a guide device ensures the vertical guidance of a welding gun in relation to a surface onto which the stud is welded. The stud itself is pushed into a guide block which in turn is displaceable, by means of springs coordinated with it, in the axial direction of the welding gun. During the welding process, the stud is pressed against the surface by means of the welding gun. The guide block is provided for ensuring that the welding gun remains positioned at right angles to the surface during the welding process.

Although relatively large diameters can also be welded by means of the elevator ignition technique, this method requires an inert gas atmosphere, the energy requirement is higher, the welding time is longer and the tendency to burn through the stud on the part to be welded on is greater so that at least very strong welding discolorations always remain behind on the lower surface of the plate when such a stud is welded onto a thin plate. However, this is undesirable in many cases.

Consequently, it has not been possible to date to weld on studs having a diameter of more than 8 mm cleanly,
without an inert gas and
in a short time.

This gives rise to an object of the present invention permit in particular a tang to be welded onto a trowel blade cleanly, without an inert gas and in a short period of time.

Extensive attempts have been made to achieve this object. An initial shown that an important phenomenon leading to the difficulties mentioned is the fact that, when the welding current is triggered, the stud has the tendency to "float away" on the end which has become liquid. This tendency cannot be counteracted by the conventional pressure-application devices acting exclusively axially, i.e. the investigations led to the discovery that this is not just a centering problem during the welding process, which may last a very short time where the tip ignition process functions within milliseconds.

Based on this discovery, according to a preferred embodiment of the invention, a positioning pressure is applied to at least two points spaced away from the axis of the stud. By virtue of the fact that the pressure now involves force components which are parallel and symmetrical in terms of the angle, decentering is not so easily possible, and any decentering tendencies due to the geometry of the stud or of the device can preferably be compensated by separately adjusting the pressure at the at least two points. For this purpose, all that is required is a test weld in order to be able to make the necessary adjustment, "separate" adjustment being intended to mean one in which an adjustment of one pressure does not necessarily result in an equally large adjustment of the other pressure.

Although the above statements indicate that the invention can be applied in principle to all embodiments of the stud-welding process, the object of the invention is preferably achieved when the tip ignition method is used.

An application of the process according to the invention in which the advantages are utilized to a particularly high degree is welding a stud to be used as a tang of a trowel onto the trowel surface. In this case, however, it is preferable if the tang is bent prior to welding, since on the one hand this is easier and on the other hand the action of high forces on the welding spot is avoided in this manner.

The centering problem discussed above is even better controlled when a stud having a non-straight shape is held firmly in a mold surrounding it.

Although the process according to the invention has quality advantages for the welding of all stud thicknesses, it can be particularly advantageously used for studs having a cross-sectional thickness (i.e. the diameter in the case of a circular cross-section) greater than 8 mm, for which those skilled in the art previously believed the stud-welding process was in principle unsuitable.

Although it has been found that pressure application to at least two points is entirely sufficient, the application of an additional axial force gives rise to a further improvement.

Another object of the present invention is to provide a device for carrying out stud welding by applying a positioning force to at least two points away from the axis of the stud.

Another object of the present invention is to provide a device wherein at least one pressure member is formed by a fluidic piston/cylinder unit and the stud to be welded is held in a mold.

The stud holder is held exclusively on at least one of the pressure-application devices, but the opening and closing devices for the mold halves of the holder are not rigidly connected to the housing, guidance of the stud during the welding process is determined exclusively by the pressure-application devices. Thus, opening—and if necessary also closing—of the mold halves is effected by means of suitably chosen coupling members which do not prevent the downward movement of the stud in its holder.

Further details of the invention are evident from the following description of embodiments shown schematically in the drawings.

BRIEF DESCRIPTION OF THE DRAWINGS

FIG. 1 shows an embodiment according to the invention, of which

DETAILED DESCRIPTION OF PREFERRED EMBODIMENTS

Figure 1:
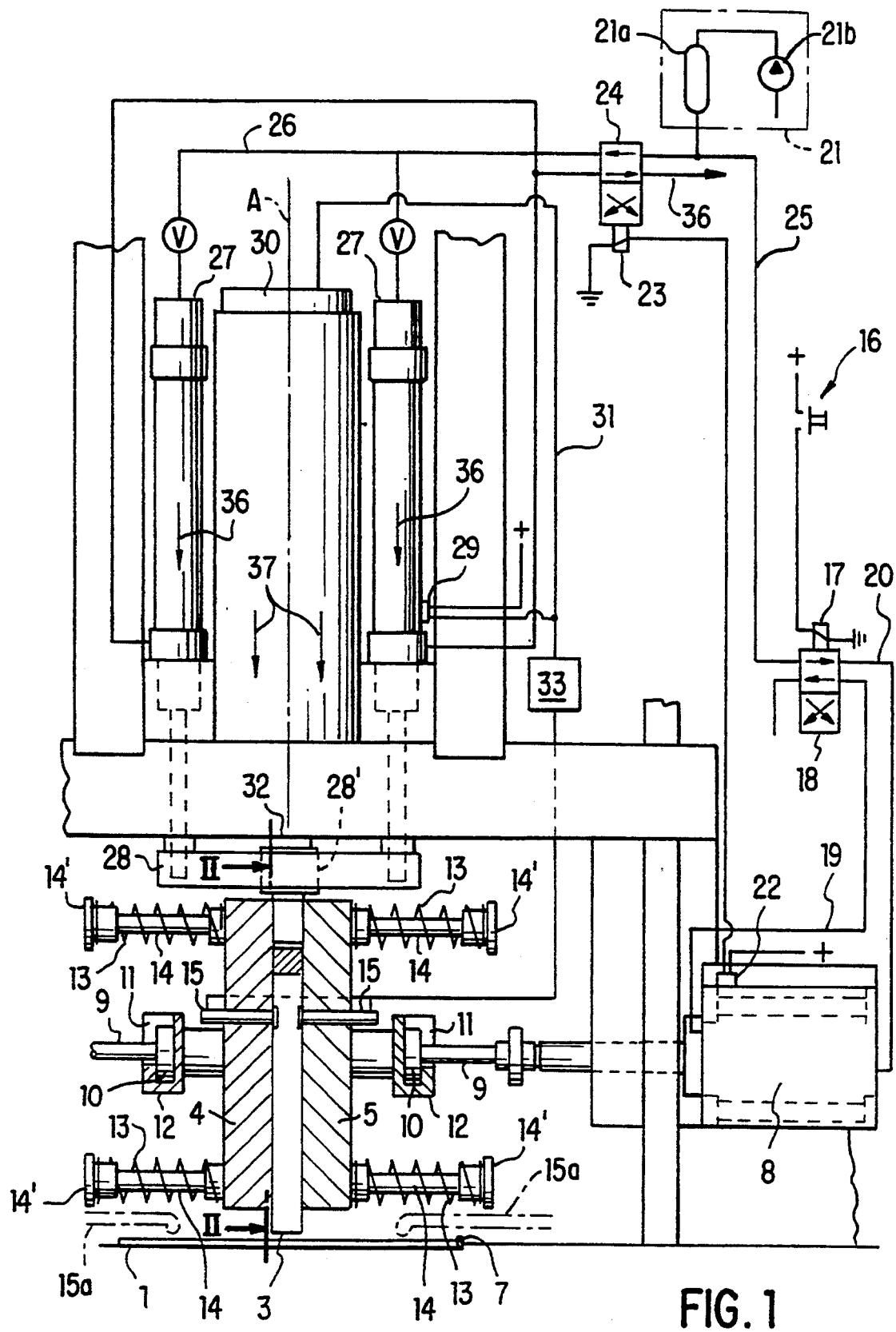

According to FIG. 1, a trowel blade 1 and a tang 2 are to be connected to one another by stud-welding. For this purpose, the tang 2 has a tip 3 facing the trowel blade. The trowel blade 1 is connected to at least one earth electrode 15a, preferably two earth electrodes 15a, which in this case are merely indicated by dash-dot lines. These earth electrodes 15a may be stationary and, when successive trowel blades 1 are transported along a track 7 at right angles to the plane of the drawing, may scrape over the surface of said blades. During the welding process, the earth electrodes 15a are subjected to pressure.

Figure 2:
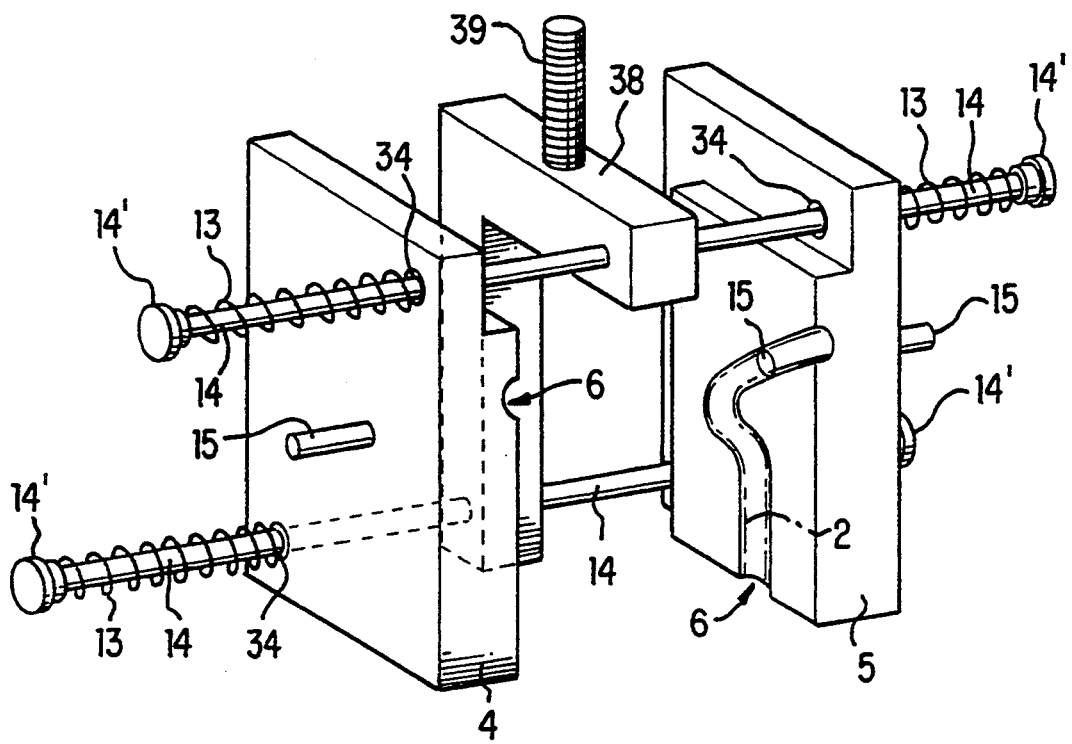
FIG. 2 shows an exploded perspective view of the mold or the stud holder.

In order to hold in position the tang 2 which is already bent, as is evident in particular from FIG. 2, two mold halves 4, 5 enclose the tang 2 in a depression or hollow 6 provided in the halves 4, 5. The hollow 6 can be provided only in one of the mold halves 4 or 5 but is preferably arranged approximately half in one and half in the other mold halves 4, 5, in which case the tang 2 can be released from the two mold halves 4, 5 by a symmetrical movement of the latter. For this purpose, the two mold halves 4, 5 can be moved relatively to one another from the colosed position shown in FIG. 1 to an open position shown in FIG. 2. In principle, this could also be effected if one mold half is rigid and only the other mold half is movable, but it is more advantageous if both mold halves 4, 5 can be moved apart and toward one another, since this facilitates the release of the tang 2.

To facilitate insertion and removal of the tang 2 from the mold havles 4, 5, a certain amount of play must be provided in the hollow 6. Consequently, the tang 2 can move slightly when placed on the trowel blade 1, and the shape of the hollow 6 should therefore be chosen so that the tang 2, when mounted on the trowel blade 1, assumes the desired position with certainty. The process according to the invention is preferably used for studs or tangs 2 having a relatively large diameter of a relatively large cross-sectional thickness (if the cross-section differs from a circular shape) so that the hollow 6 (calculated for both mold halves 4, 5) also preferably has a cross-sectional thickness greater than 8 mm.

FIG. 1 merely shows the nature of the mobility of the mold half 5 and only indicates that of mold half 4, but of course the movement of the mold half 4 is the same as that of the mold half 5. The movement of the mold half 5 is controlled by a cylinder unit 8, and it is clear that, in a preferred embodiment, an identical unit is coordinated with the mold half 4. If necessary, however, it is also possible to provide only a single unit 8, the movement controlled by it being transmitted to the mold half 4 via a movement-reversing gear of a type known per se.

A piston rod 9 projects from the cylinder unit 8 and ends in a hook or a disk 10 which engages a slot 11 of a coupling part 12 and is capable of sliding in an upward or downward direction. This connection permits an unhindered vertical movement of the tang 2 together with the mold halves 4, 5 toward the trowel blade 1. On the other hand, the mold half 5 is moved by the cylinder unit 8 by driving the coupling part 10 connected to the mold half 5 against the action of pressure springs 13 which are arranged on pin-like pressure spring holders 14. As shown in FIG. 2, each pressure spring holder 14 (in the simplest case, it would also be possible for only a single pressure spring holder to be coordinated with a mold half) is inserted into holes 34 of the mold halves 4, 5, caps 14 being screwed onto the ends of the pressure spring holders 14 and pressure springs 13 being supported with one of their ends on said caps at both ends of these pins 14, the other end of said pressure springs pressing against the associated mold half 4 or 5. An electrode 15 is connected to at least one of the mold halves 4, 5, but, in order to achieve a symmetrical flow of current, preferably to both mold halves.

When a triggering switch 16 is closed, a solenoid 17 brings a valve 18 into the position shown in FIG. 1, in which a pipe 19 is connected to the outflow whereas a pipe 20 is connected to a pressure source 21, which is expediently pneumatic. This pressure source 21 advantageously comprises not only a corresponding pressure medium pump 21b but also a pressure tank or store 21a, by means of which the corresponding amoumt of pressure medium, in particular compressed air, can be provided rapidly, even when the pump 21b is relatively small.

If the pipe 20 is connected to the pressure source 21, the mold halves 4, 5 reach the closed position shown. This could be achieved inevitably by means of the unit 8, but in the present case the actual closing force is provided by the pressure springs 13 which the piston of the unit 8 only follows, so that the closing force is always exactly defined. It would also be possible to omit the pipe 20 and merely to allow the pressure springs 13 to act when discharging the air (or another fluid) via the pipe 19.

As soon as the mold halves 4, 5 reach the closed position shown, the next step can be automatically triggered by a corresponding transmitter. In this example, a reed relay 22 is provided for this purpose on the cylinder unit 8 and is operated by the piston of this unit 8. Thus, a solenoid 23 is subjected to a current and brings the valve 24 into the position shown. Consequently, the supply pipe 25 is now also connected to a pipe 26 which comprises at least two pneumatic cylinders 27 arranged angularly symmetrically with the axis A passing through the device. In principle, the fluidic pressure could also be provided by means of a hydraulic medium, but the application of an elastic pressure by compressed air was more advantageous. However, it is clear that the unit 8 is then advantageously also supplied by the same pressure source 21, although a seperate pressure source could also be used.

The pneumatic cylinders 27 now initially exert a pressure via a pressure disk 28 on the mold halves 4, 5 or the tang 2, which in the case of the trowels usually has a diameter which is not inconsiderable and in any case exceeds the thickness of 8 mm usual for a stud-welding process, said pressure pressing the tang 2 and centering it against the trowel blade 1 to be welded on, prior to ignition of the welding current. Centering is achieved on the one hand by virtue of the fact that the pressure disk 28 represents a sort of "base" which distributes the force components 36 of the cylinders 27 acting on it more advantageously than in the case of central pressure application, and thus prevents the stud 2 from "floating away" on the weld melt.

It is also preferable that the pressures 36 of the two pneumatic cylinders 27 are adjustable independently of one another. For this purpose, an adjusting valve V is provided in each of the supply pipes 26, by means of which valve the pressure in the cylinders 27 can be adjusted. A possible alternative would be to arrange inside the cylinders 27 springs acting against the pneumatic pressure and having an adjustable spring force, the pneumatic pressure being constant. In any case, various solutions are possible for adjusting the force components 36.

Figure 3:
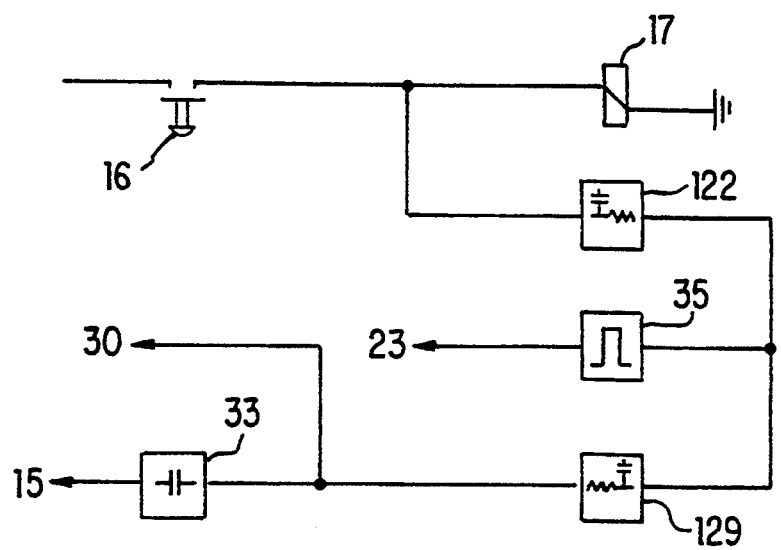
FIG. 3 shows a variant of the circuit shown in FIG. 1.

If necessary, a reed relay 29 may also be provided here in order to detect the bottom position of the piston belonging to the cylinders 27; however, the stroke of said piston is rather small (the cylinders 27 need only be capable of performing a longer stroke to adapt to different mold and tang sizes unless mold halves of the same size are used for all tang shapes and sizes), and triggering of the next step is preferably effected by means of a time member instead of the relay 29, as will be described subsequently with reference to FIG. 3.

With the activation of the reed relay 29 (or of another transmitter), an acceleration member, expediently one formed by a conventional spring gun 30, is triggered via a line 31. The spring of this spring gun 30 presses the stud 2 axially in the direction of the vectors 37 prior to welding, and this alone previously permitted a slight oblique position or decentering of the stud 2 or prevented thicker studs (and also longer ones) from being welded. With the triggering via the line 31, an additional force which likewise acts in the direction of the vectors 37, generally by magnetic means, is now applied at the instant of triggering of the welding current, in order to accelerate or to press the tang 2 forming the stud against the trowel blade 1.

The transmission of these additional forces 37 can take place in various ways. It would be possible for these forces (spring force+triggered magnetic hammer force) likewise to act directly on the pressure plate 28, which transmits it to the mold halves 4, 5 and the tang 2. Here, however, the pressure plate 28 is provided with a central opening 28' through which the spring gun 30 penetrates and acts directly on the mold 4, 5 and the tang 2.

Arranged between the two mold halves 4, 5 is a frame 38, by means of which on the one hand the pressure spring holders 14 are guided and on which on the other hand a fastening means, for example in the form of a screw shaft 39, is provided and enables the two mold halves 4, 5 to be fastened in a holder 32. The two mold halves 4, 5 can thus either—as in the case shown in FIG. 1—be held by means of the holder 32 on the spring gun 30 and extends through the opening 28' of the pressure plate 28, or directly fastened to the pressure plate 28, which then has no opening 28'. The line 31 is also connected to a current source 33

The line 31 is also connected to a current source 33 which contains, inter alia, a capacitor for providing a corresponding quantity of energy which is discharged by the signal arriving from the line 31 (for example via a switching relay). The circuit is designed so that the tang 2 then receives its pulses from the magnetic hammer 30 when a certain weld melt has formed, i.e. the time constant of the melt and of the triggering of the magnetic hammer 30 until contact with the mold 4, 5 are matched with one another.

When ignition of the welding current has taken place, the device is reset, either by virtue of the fact that the switch 16 is released again manually or that the switch 16 is in the form of a time-lag relay and, after elapse of a predetermined time, returns to the open position, or that a delayed reset command is given via the line 31. The valves 18 and 24 then return from the positions shown to their starting position, in which the supply and discharge pipes are interchanged with one another. A new cycle can then take place.

FIG. 2 shows, as dash-dot lines, a possible embodiment of a tang 2 which is inserted into a half-hollow 6 of the mold half 5 (the other half-hollow 6 is present in the mold half 4). Also evident is the mounting of the electrodes 15, which in FIG. 1 are attached to the same line but, if desired, can also be supplied with current via separate lines. The tang 2 already has the desired curve or bend, since bending after welding could result in undesired stresses at the weld spot.

In FIG. 3, parts having the same function are provided with the same reference symbols, a hundred digit being added where the function differs slightly. Of course, the trigger switch 16 is once again shown as a simple manual switch although, as explained above, it may also be of different design.

After this switch 16 has been closed, the solenoid 17 is energized and (according to FIG. 1) operates the valve 18 for controlling the unit 8. A parallel current path contains a first delay member 122, by means of which a monostable trigger circuit 35 is driven. The trigger circuit 35 has a time constant such that the solenoid 23 of the valve 24 (cf. FIG. 1) remains energized for a sufficiently long time for carrying out the initial pressure application, the acceleration of the magnetic hammer 30 and the ignition of the welding current. The monostable trigger circuit 35 then returns to its starting position, i.e. the valve 24 reaches a position in which the pipe 26 is connected to an outflow pipe 36 and the particular piston of the cylinder 27 moves upward.

However, the delay member 122 also drives a further delay member 129 which—after the initial pressure has been applied via the cylinder 27—drives the magnetic hammer 30 and the current source 33. It has already been mentioned that this current source 33 may itself have a delay member (with a very short time constant).

From these explanations it is evident that the sensors 22 and 29 actually also have the function of time members although here too the time constant is not exactly predetermined. Of course, mixed forms of the controls shown in FIG. 1 and in FIG. 3 are possible and—as stated above—in particular the sensor 29 is expediently replaced by the time member 129, but the reed relay 22 (or any other position sensor suitable for this purpose) is used in place of the time member 122. A lower or higher degree of automation would also be possible for example if the tangs 2 are inserted from a magazine fully automatically into the molds 4, 5 and the operation and triggering of the other controlled parts take place synchronously, the trowel blades 1 being fed by means of conveyors stepwise over the track 7 (at right angles to the plane of the drawing). Furthermore, the step frequency of this conveyor could then be controlled in a manner similar to that described above for the other process steps.

Returning to FIG. 1, it can be seen there that the force vectors 36, 37 of the forces exerted on the one hand by the cylinders 27 and on the other hand by the magnetic hammer 30 are parallel to one another. This also facilitates the housing of the parts 27 and 30. The problem of uniform distribution of the forces is solved by the pressure plate 28, which, if desired, can also interact with more than two cylinders 27 and, if desired, a plurality of magnetic hammers 30 can also be provided, although this once again may lead to synchronization difficulties, and it has in fact been shown that the magnetic hammer can also be omitted.

When it is stated in connection with this invention that the pressure-application device 27 presses against the stud 2, in a (preferred) embodiment according to FIG. 1 this occurs only indirectly, via the mold halves 4, 5. In principle, it would be possible to provide a gripper for holding the stud, instead of the mold halves 4, 5, and to allow the pressure-application device 27 or the pressure-application device 30 to act directly on the stud 2, unless the anvil plate 28 is also in between them. This can occur, for example, in the case of straight studs, but the use of the mold halves 4, 5 is advisable in the case of pre-bent tangs.

When the invention is applied to the elevator ignition process, corresponding means for supplying inert gas must of course be provided.

I claim:

1. A process for stud-welding a stud to a surface, the process comprising: accelerating the stud toward the surface with an accelerating force acting along a stud axis while igniting an arc, whereupon an end face of the stud is immersed in a melt bath formed by melting of the end face of the stud and the surface, and at least prior to accelerating the stud, positioning the stud relative to the surface and pressing the stud against the surface by means of at least two positioning forces, wherein the at least two positioning forces are essentially parallel to the stud axis, and are approximately angularly symmetrical to said stud axis, and the at least two positioning forces act at two or more points outside the stud axis so that the stud does not float away laterally on immersion in the melt bath.

2. A process as claimed in claim 1, wherein the magnitude of said at least two positioning forces are capable of being adjusted separately.

3. A process as claimed in claim 1, wherein a tip ignition method is used.

4. A process as claimed in claim 1, wherein the stud produced is a tang for a trowel, wherein the tang is to be welded onto a trowel surface.

5. A process as claimed in claim 4, wherein the tang is bent prior to welding onto the trowel surface.

6. A process as claimed in claim 1, wherein the stud has a non-straight shape and is held firmly in a mold surrounding the stud.

7. A process as claimed in claim 1, wherein the stud has cross-sectional thickness greater than 8 mm.

8. A process as claimed in claim 1, further comprising: applying axial pressure in addition to the positioning forces to the stud approximately at the instant of triggering of a welding current.

9. A device for welding a stud to a surface, wherein the stud is positioned relative to the surface and pressed against the surface by at least two positioning forces, accelerated toward the surface by an accelerating force and immersed in a melt bath formed by melting an end face of the stud and the surface, said device comprising:
a welding current source from which current can be applied by means of a trigger switch to the stud;
a pressure-application device for generating a compressive force acting on the stud prior to triggering of the welding current;
an acceleration member which accelerates the stud at the instant of triggering of the welding current against the surface;
wherein the pressure-application device has at least two pressure members exerting a compressive force parallel to one another, the at least two pressure members are connected to one another by means of a pressure plate for loading the stud; and
an adjusting device for adjusting the compressive force of each pressure member.

10. A device as claimed in claim 9, wherein the acceleration member is a magnetic hammer.

11. A device as claimed in claim 9, wherein at least one pressure member is formed by a fluidic piston/cylinder unit which can be connected to a pressure source.

12. A device as claimed in claim 9, further comprising:
a mold having at least two parts for holding the stud in a hollow of the mold, said hollow having a shape that corresponds to said stud, the mold is connected to at least one welding electrode and is held on one of the pressure-application devices;
a loading means for exerting a predetermined force on, said at least two parts of the mold when the mold is in a closed position encompassing the stud said loading means having at least one pressure spring, and a pressure spring holder passing through the mold parts and through said at least one pressure spring;
at least two electrodes, each electrode being connected to one of said mold parts;
at least one linear drive for opening and closing the mold parts, said at least one linear drive operating in opposition to the loading means; and
a program circuit for operating the at least one linear drive and the welding current source, wherein the hollow formed by the mold parts has a cross-sectional thickness exceeding 8 mm.

13. A device as claimed in claim 12, wherein the at least one linear drive is at least one pneumatic piston/cylinder unit.

14. A device as claimed in claim 12, wherein the pressure spring holder includes a pin member passing through the mold parts and the at least one pressure spring is clamped between said mold parts and an end of the spring holder.

* * * * *